US011966305B2

(12) United States Patent
Li

(10) Patent No.: US 11,966,305 B2
(45) Date of Patent: Apr. 23, 2024

(54) DATA PROCESSING METHOD FOR DISTRIBUTED STORAGE SYSTEM, APPARATUS, AND ELECTRONIC DEVICE

(71) Applicants: BEIJING KINGSOFT CLOUD NETWORK TECHNOLOGY CO., LTD., Beijing (CN); BEIJING KINGSOFT CLOUD TECHNOLOGY CO., LTD., Beijing (CN)

(72) Inventor: Haibing Li, Beijing (CN)

(73) Assignees: BEIJING KINGSOFT CLOUD NETWORK TECHNOLOGY CO., LTD., Beijing (CN); BEIJING KINGSOFT CLOUD TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/772,939

(22) PCT Filed: Sep. 30, 2020

(86) PCT No.: PCT/CN2020/119346
§ 371 (c)(1),
(2) Date: Apr. 28, 2022

(87) PCT Pub. No.: WO2021/082868
PCT Pub. Date: May 6, 2021

(65) Prior Publication Data
US 2023/0033754 A1 Feb. 2, 2023

(30) Foreign Application Priority Data
Oct. 31, 2019 (CN) .......................... 201911051737.5

(51) Int. Cl.
*G06F 11/00* (2006.01)
*G06F 11/20* (2006.01)

(52) U.S. Cl.
CPC ...... *G06F 11/2028* (2013.01); *G06F 11/2082* (2013.01)

(58) Field of Classification Search
CPC .................... G06F 11/2028; G06F 11/2082
See application file for complete search history.

(56) References Cited

U.S. PATENT DOCUMENTS 6,732,289 B1 * 5/2004 Talagala .............. G06F 11/2092
714/E11.092
10,552,058 B1 * 2/2020 Jadon .................... G06F 3/0647
(Continued)

FOREIGN PATENT DOCUMENTS

CN 101697494 A 4/2010
CN 103384211 A 11/2013
(Continued)

OTHER PUBLICATIONS

The State Intellectual Property Office of People's Republic of China; Chinese Office Action; Chinese Application No. 201911051737.5, dated Aug. 25, 2021; 12 pages.
(Continued)

*Primary Examiner* — Loan L. T. Truong
(74) *Attorney, Agent, or Firm* — Faegre Drinker Biddle & Reath LLP

(57) ABSTRACT

Provided are a data management method for a distributed storage system, an apparatus, and an electronic device. The method comprises: sending to each storage server a first request for acquiring data copy information; and according to the data copy information returned by each storage server in response to the first request, updating mapping data used
(Continued)

to reflect the correspondence between the data copy information and the storage servers.

9 Claims, 3 Drawing Sheets

(56) References Cited

U.S. PATENT DOCUMENTS

| | | | | |
|---|---|---|---|---|
| 2008/0301495 | A1* | 12/2008 | Kalos | G06F 11/2092 |
| | | | | 714/16 |
| 2013/0007512 | A1* | 1/2013 | Amin | G06F 11/2033 |
| | | | | 714/10 |
| 2013/0173553 | A1 | 7/2013 | Apte et al. | |
| 2014/0279905 | A1* | 9/2014 | Muniswamy-Reddy | |
| | | | | G06F 3/0683 |
| | | | | 707/639 |
| 2014/0304489 | A1* | 10/2014 | Colgrove | G06F 3/0641 |
| | | | | 711/208 |
| 2015/0046394 | A1 | 2/2015 | Onda et al. | |
| 2015/0143164 | A1* | 5/2015 | Veerla | G06F 11/2069 |
| | | | | 714/54 |
| 2016/0077752 | A1* | 3/2016 | Vanninen | G06F 3/067 |
| | | | | 711/114 |
| 2016/0253268 | A1* | 9/2016 | Danilak | G06F 12/0246 |
| | | | | 714/6.3 |
| 2017/0257275 | A1* | 9/2017 | Atyam | H04L 41/0893 |
| 2019/0065092 | A1* | 2/2019 | Shah | G06F 3/0617 |
| 2019/0188100 | A1* | 6/2019 | Patel | G06F 3/067 |
| 2019/0272222 | A1* | 9/2019 | Wei | G06F 3/0611 |
| 2020/0293229 | A1* | 9/2020 | Wang | G06F 12/08 |
| 2021/0303157 | A1* | 9/2021 | Byun | G06F 3/0604 |

FOREIGN PATENT DOCUMENTS

| | | |
|---|---|---|
| CN | 103577500 A | 2/2014 |
| CN | 108173971 A | 6/2018 |
| CN | 109284069 A | 1/2019 |
| CN | 109672544 A | 4/2019 |
| CN | 109684412 A | 4/2019 |

OTHER PUBLICATIONS

China National Intellectual Property Administration; International Search Report; International Application No. PCT/CN2020/119346, dated Dec. 30, 2020.

* cited by examiner

DATA PROCESSING METHOD FOR DISTRIBUTED STORAGE SYSTEM, APPARATUS, AND ELECTRONIC DEVICE

This application is a national stage of International Application No. PCT/CN2020/119346, filed on Sep. 30, 2020, which claims priority to Chinese Patent Application No. 201911051737.5, titled "DATA PROCESSING METHOD AND DEVICE FOR DISTRIBUTED STORAGE SYSTEM, AND ELECTRONIC EQUIPMENT", filed on Oct. 31, 2019 with the China National Intellectual Property Administration, both of which are incorporated herein by reference in their entireties.

FIELD

The present disclosure relates to the technical field of distributed storage, and in particular, to a data processing method for a distributed storage system, a data processing device for a distributed storage system, electronic equipment and a distributed storage system.

BACKGROUND

Distributed storage is a storage solution for storing data in multiple independent devices dispersedly. A distributed network storage system adopts an expandable system structure and utilizes multiple storage servers to share a storage load, which not only improves reliability, availability, and access efficiency of the system, but also is easy to expand.

In the distributed storage system, a dedicated control server is usually used to coordinate storage of data in multiple data servers. The control server stores metadata for describing data attributes, which may realize functions such as storage location recording, historical data recording, and resource search. Multiple control servers are usually provided in order to improve the reliability of the system. A master control server provides a control service, and a slave control server serves as a backup.

The master control server and the slave control server may maintain metadata consistency therebetween by data synchronization. However, if a failure such as the master control server crashing occurs in a data synchronization process, a part of metadata update information will be lost, and operation of the distributed storage system will be affected.

SUMMARY

An objective of the present disclosure is to provide a new technical solution for data processing in a distributed storage system.

In a first aspect, a data processing method for a distributed storage system is provided according to an embodiment of the present disclosure, which is performed by a slave control server of the distributed storage system. The method includes:
  transmitting, to each storage server, a first request for acquiring data copy information; and
  updating mapping data based on the data copy information returned by each storage server in response to the first request, where the mapping data indicates a correspondence relationship between the data copy information and the storage server.

In a second aspect, a data processing method for a distributed storage system is provided according to an embodiment of the present disclosure, which is performed by a storage server of the distributed storage system. The method includes:
  receiving a request for acquiring data copy information from a slave control server; and
  transmitting, in response to the request for acquiring the data copy information, the data copy information corresponding to the storage server to the slave control server.

In a third aspect, a data processing device for a distributed storage system is provided according to an embodiment of the present disclosure, which is applied to a slave control server of the distributed storage system. The data processing device includes:
  a request transmitting module configured to transmit a first request for acquiring data copy information to each storage server; and
  a data updating module configured to update mapping data based on the data copy information returned by each storage server in response to the first request, where the mapping data indicates a correspondence relationship between the data copy information and the storage server.

In a fourth aspect, a data processing device for a distributed storage system is provided according to an embodiment of the present disclosure, which is provided in a storage server of the distributed storage system. The data processing device includes:
  a request receiving module configured to receive a first request for acquiring data copy information from a slave control server; and
  a data transmitting module configured to transmit the data copy information stored in the storage server to the slave control server, in response to the first request.

In a fifth aspect, an electronic equipment is provided according to an embodiment of the present disclosure. The electronic equipment includes a processor and a memory. The memory stores machine executable instructions that can be executed by the processor. The processor is configured to execute the machine executable instructions to perform the data processing method for the distributed storage system described in the first or second aspect according to the embodiments of the present disclosure.

In a sixth aspect, a distributed storage system is provided according to an embodiment of the present disclosure. The distributed storage system includes a master control server, a slave control server configured to perform the method described in the first aspect according to the embodiments of the present disclosure, and a storage server configured to perform the method described in the second aspect according to the embodiments of the present disclosure. The storage server is communicatively connected to the master control server and the slave control server, respectively.

Other features and advantages of the present disclosure will become clear through the following detailed description of exemplary embodiment of the present disclosure with reference to accompany drawings.

BRIEF DESCRIPTION OF THE DRAWINGS

The drawings incorporated in the specification and constituting a part of the specification illustrate embodiments of the present disclosure, and are intended to, together with the description thereof, explain principles of the embodiments of the present disclosure.

DETAILED DESCRIPTION

Figure 1:
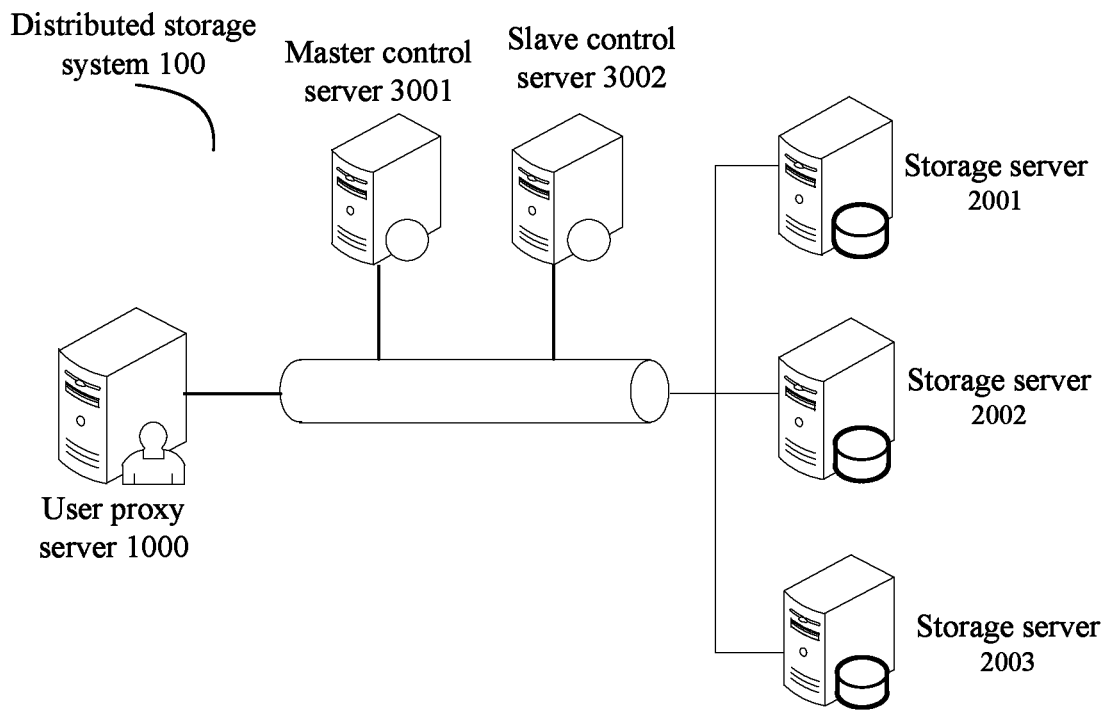
FIG. 1 shows a schematic diagram of a hardware configuration of a distributed storage system according to an embodiment of the present disclosure.

Various exemplary embodiments of the present disclosure are described hereinafter in detail with reference to the drawings. It should be noted that unless specifically stated otherwise, the relative arrangement of components and steps, numerical expressions and numerical values set forth in these embodiments do not limit the scope of the embodiments of the present disclosure.

The following description of at least one exemplary embodiment is merely illustrative, and in no way servers as any limitation to the embodiments of the present disclosure and application or use thereof.

The techniques, methods, and equipment known to those of ordinary skill in the relevant fields may not be discussed in detail, but where appropriate, the techniques, methods, and equipment should be regarded as part of the specification.

In the examples illustrated and discussed herein, any specific value should be interpreted as merely exemplary, rather than as a limitation. Therefore, other examples of the exemplary embodiments may have different values.

It should be noted that similar reference numerals and letters indicate similar items in the drawings, and therefore, an item, once being defined in a drawing, does not need to be further discussed in the subsequent drawings.

<Hardware Configuration>

FIG. 1 shows a schematic structural diagram of a distributed storage system according to an embodiment of the present disclosure.

As shown in FIG. 1, a distributed storage system 100 includes a user proxy server 1000, a storage server 2001, a storage server 2002, a storage server 2003, a control server 3001, and a control server 3002. The distributed storage system 100 includes multiple (two or more) storage servers and multiple (two or more) control servers. In an embodiment of the present disclosure, the number of storage servers, the number of control servers, and the number of user proxy servers are all exemplary, which will not be limited in the embodiment of the present disclosure.

In the embodiment, the distributed storage system stores target data in a basic unit of data block. For example, a target file is divided into multiple data blocks, and multiple copies of each of the data blocks are stored into multiple independent storage servers. In an example, each of the data blocks corresponds to three data block copies, in which one data block copy serves as a master copy and the other two data block copies serve as slave copies. The storage server for storing the master copy has priority in processing a read and write request for the target file. The storage server for storing a slave copy serves as a backup.

The storage server 2001, the storage server 2002, and the storage server 2003 are configured to store target data, for example, to store the data block copies corresponding to the target data.

The control server 3001 and the control server 3002 are configured to manage metadata, for example, to manage mapping data that indicates a correspondence relationship between a data block copy corresponding to the target file and a storage server. One of the control servers serves as a master control server to provide a control service for the distributed storage system. The other control server serves as a slave control server to back up data in the master control server. In the embodiment, the control server 3001 serves as the master control server and the control server 3002 servers as the slave control server. The control server to be used as the master control server may be interchanged with the control server to be used as the slave control server. When the master control server fails, the slave control server may replace the master control server to provide the control service for the distributed storage system.

The user proxy server 1000 is configured to receive from a user end a data read and write request for the target data, and forward the data read and write request to a control server.

The master control server 3001 may receive the data read and write request from the user proxy server 1000; then query, based on the metadata stored in the master control server 3001, the storage server where a data block copy corresponding to the target data is located; and return, to the user proxy server 1000, identification information of the storage server that processes the data read and write request. According to the identification information, the user proxy server 1000 interacts with the corresponding storage server to complete a read and write operation on the target data.

The user proxy server 1000, the storage server 2001, the storage server 2002, the storage server 2003, the control server 3001, and the control server 3002 may communicate with each other via a wired network or a wireless network.

Figure 2:
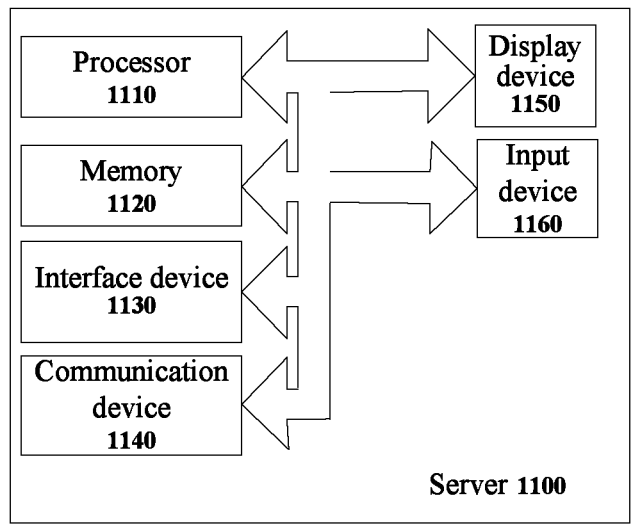
FIG. 2 shows a schematic structural diagram of a server according to an embodiment of the present disclosure.

Each of the user proxy server 1000, the storage server 2001, the storage server 2002, the storage server 2003, the control server 3001, and the control server 3002 has a hardware configuration of a server 1100 as shown in FIG. 2. As shown in FIG. 2, the server 1100 may include a processor 1110, a memory 1120, an interface device 1130, a communication device 1140, a display device 1150, and an input device 1160. The processor 1110 may be, for example, a central processing unit CPU or the like. The memory 1120 includes, for example, an ROM (Read-Only Memory), an RAM (Random Access Memory), a non-volatile memory such as a hard disk, and the like. The interface device 1130 includes, for example, a USB interface, a serial interface, and the like. The communication device 1140 is able to perform wired or wireless communication. The display device 1150 is, for example, a liquid crystal display. The input device 1160 may include, for example, a touch screen, a keyboard, and the like.

In an embodiment of the present disclosure, the memory 1120 of the server 1100 is configured to store instructions. The instructions are used to control the processor 1110 to operate to implement the data processing method according to any embodiment of the present disclosure. The skilled in the art may design the instructions based on the scheme disclosed in this specification. The method for controlling the processor to operate based on the instructions is well known in the art, which will not be described in detail herein.

Those skilled in the art should understand that, although multiple devices in the server 1100 are shown in FIG. 2, only a part of the devices may be involved in the server 1100 according to an embodiment of the present disclosure. For example, only the processor 1110, the memory 1120, and the communication device 1140 are involved.

The distributed storage system 100 shown in FIG. 1 is merely explanatory, which is by no means intended to limit this specification and application or usage thereof.

Method Embodiment

Figure 3:
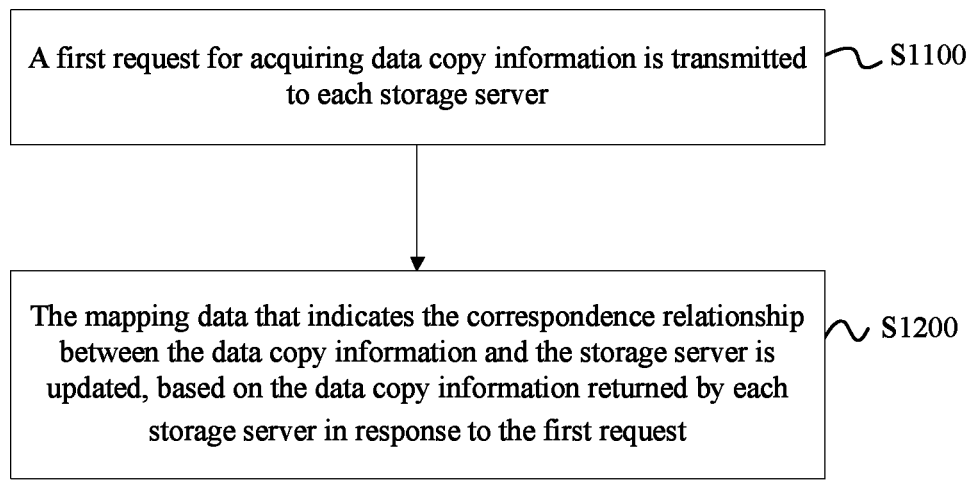
FIG. 3 shows a flowchart of a data processing method for a distributed storage system according to an embodiment of the present disclosure.

A data processing method for a distributed storage system is provided according to an embodiment of the present disclosure. The method is implemented by, for example, the slave control server 3002 shown in FIG. 1. As shown in FIG. 3, the method includes the following steps S1100 to S1200.

In step S1100, a first request for acquiring data copy information is transmitted to each storage server.

In this embodiment, a control server is configured to manage metadata, for example, to manage mapping data that indicates a correspondence relationship between a data block copy corresponding to a target file and a storage server. A master control server provides a control service for the distributed storage system, and a slave control server serves as a backup.

In an embodiment, the distributed storage system stores target data in a basic unit of data block. For example, a target file is divided into multiple data blocks, and multiple copies of each of the data blocks are stored into multiple independent storage servers. In an example, each of the data blocks corresponds to three data block copies, in which one data block copy serves as a master copy and the other two data block copies serve as slave copies. For example, the three copies are indicated as A, B, and C, and are stored in storage servers numbered as 1, 2, and 3, respectively.

In an embodiment, the slave control server transmits the first request for acquiring data copy information to each storage server, to acquire information about the data block copy stored in the storage server. In an implementation of this step, the storage server for storing the master copy has priority in response to the first request.

In an embodiment, the method according to an embodiment of the present disclosure may further include: detecting whether the master control server is in an unavailable state. Exemplarily, the slave control server may transmit a state inquiry request to the master control server (through a heartbeat interaction, for example). It may be determined that the master control server is currently in an unavailable state if the master control server does not respond to the inquiry request. On this basis, step S1100 may include: transmitting the first request for acquiring the data copy information to each storage server, in the case where the master control server is in the unavailable state.

In an embodiment, the unavailable state of the master control server includes, for example, crashing of the master control server, interruption of communication between the master control server and the outside, or the like. It is easy to understand that the master control server in the unavailable state means that the master control server cannot normally provide the control service for the distributed storage system.

In an embodiment, the step of the slave control server detecting whether the master control server is in the unavailable state may include: receiving from a monitoring device (for example, zookeeper) a notification about whether the master control server is in the unavailable state; and determining whether the master control server is in the unavailable state based on the notification. In an example, the monitoring device acquires an operation state of the master control server by receiving a heartbeat packet periodically transmitted by the master control server. Exemplarily, the monitoring device (for example, zookeeper) may periodically performs a heartbeat signal connection with a control server (the master control server or the slave control server). If the monitoring device fails to receive the heartbeat signal from the master control server within a preset time period, it may be determined that the master control server is in the unavailable state, and then the notification is transmitted to the slave control server. The slave control server may determine that the master control server is in the unavailable state, according to the notification from the monitoring device.

In an embodiment, the monitoring device is configured to monitor an operation state of the master control server. The monitoring device may be an additional physical device or the slave control server itself. For example, the slave control server monitors the operation state of the master control server by a dedicated procedure therein.

In an embodiment, the monitoring device may transmit a notification to the slave control server when detecting that the master control server changes from an available state to the unavailable state. The slave control server determines that the master control server is in the unavailable state according to the notification.

In another embodiment, the step of the slave control server detecting whether the master control server is in the unavailable state, may include: performing the heartbeat signal connection between the slave control server and the master control server, and determining that the master control server is in the unavailable state if the heartbeat signal from the master control server is not received within a preset time period (for example, 1 minute).

In step S1200, the mapping data that indicates the correspondence relationship between the data copy information and the storage server is updated, based on the data copy information returned by each storage server in response to the first request.

In an embodiment, the mapping data that indicates a correspondence relationship between a data copy and a storage server is stored in the slave control server.

In an embodiment, each storage server transmits the data copy information stored therein to the slave control server, in response to the first request transmitted from the slave control server. The slave control server receives the data copy information transmitted by and stored in each storage server. Based on the received data copy information, the salve control server creates a correspondence (mapping) relationship between the data copy information and the storage server where the data copy information is located, and updates a table of mapping data (or the correspondence). The table of mapping data or correspondence relationship may include more than one piece of correspondence relationship (or mapping data) between data copy information and a storage server where the data copy information is located.

By performing step S1200, the slave control server may acquire a latest correspondence relationship between the data copy and the storage server.

In the data processing method for the distributed storage system according to an embodiment, metadata synchronization between the master control server and the slave control server does not need to be performed, which avoids loss of data update information due to a failure of the master control server in the synchronization process. In this way, the reliability of the distributed storage system is improved.

In an embodiment, the data processing method for the distributed storage system further includes: replacing the master control server with the slave control server to provide a control service for the distributed storage system based on the updated mapping data, when it is determined that the master control server is in the unavailable state. The master control server may be in the unavailable state due to power failure, downtime, or unexpected restart. When the slave control server detects that the master control server is unavailable, the slave control server replaces the master control server in time after updating the mapping data stored thereon, so as to provide the control service for the distributed storage system. In this way, a normal operation of the distributed storage system is guaranteed, which provides a security guarantee for data storage over the distributed storage system.

In an embodiment, in a process of the master control server providing the control service for the distributed storage system, for example, the master control server receives a data read request for target data from the user proxy server; queries, based on the mapping data stored in the master control server, the storage server where a data block copy corresponding to the target data is located; and returns to the user proxy server identification information of the storage server that processes the data read and write request. Thus, the user proxy server interacts with the storage server according to the identification information to complete the read and write operation on the target data.

In this embodiment, the master control server may be interchanged with the slave control server. When the master control server is in the unavailable state, the slave control server may replace the master control server to provide the control service for the distributed storage system.

In an embodiment, the slave control server may replace the master control server to provide the control service for the distributed storage system automatically (that is, by automatic switching), or in response to a manual operation (that is, by manual switching). In the embodiments of the present disclosure, the automatic switching is applied as a preferred embodiment, to ensure the security and timeliness of data storage and avoid data loss.

In an embodiment, the slave control server provides the control service for the distributed storage system based on the updated mapping data, so as to ensure a normal operation of the distributed storage system.

According to an embodiment of the present disclosure, the step S1100 may be implemented by periodically transmitting a first request for acquiring the data copy information (hereinafter referred to as a periodic request) to each storage server according to a set time.

In an embodiment, the slave control server periodically transmits the first request for acquiring the data copy information to each storage server according to the set time. In other embodiments, the slave control server may periodically transmit the first request to each storage server according to the set time, when the master control server is in the unavailable state. Exemplarily, the set time may be any time period ranges from 1 second to 1 minute, for example, 5 seconds, 10 seconds, 15 seconds, 20 seconds, 25 seconds, or the like, which may be pre-set based on an experience of a technician, and is not limited in the embodiments of the present disclosure.

By periodically acquiring the data copy information and periodically updating the mapping data, an amount of data required to be processed for each update may be reduced, which is especially beneficial for the slave control server to quickly update the mapping data when the master control server is in the unavailable state. In this way, a switching speed between the master control server and the slave control server is improved.

In an embodiment, the step S1100 may be implemented by transmitting, in an initial startup stage, a first request for acquiring data copy information (hereinafter referred to as an initial request) to each storage server.

In this embodiment, the slave control server transmits the first request for acquiring the data copy information to each storage server in the initial startup stage (the request may be referred to as an initial request hereinafter). It is easy to understand that the initial request is different from the request transmitted periodically by the slave control server and the request transmitted when the master control server is in the unavailable state.

Step S1200 is then performed, in which mapping data that indicates a correspondence relationship between a data copy and a storage server is created based on the data copy information returned by each storage server in response to the initial request.

In an embodiment, each storage server transmits the data copy information stored therein to the slave control server in response to the initial request. The slave control server receives the data copy information transmitted from each storage server, and creates the mapping data that indicates the correspondence relationship between the data copy and the storage server.

The slave control server newly creates the mapping data that indicates the correspondence relationship between the data copy and the storage server in the initial startup stage, which may be a basis for subsequent updating of the mapping data.

In an embodiment, a process of the slave control server updating the mapping data stored therein includes: modifying a current mapping data stored in the slave control server, to obtain updated mapping data.

In an embodiment, the slave control server performs the data update based on the current mapping data stored therein, which may reduce the amount of data required to be processed for each update, and is conducive to increase of an update speed.

In an embodiment, the mapping data that indicates the correspondence relationship between the data copy and the storage server is stored in a memory of the slave control server. In this way, it is conducive to increasing a speed of reading and writing the mapping data, thereby increasing the speed of data update.

In the above method embodiments, there are implementations and corresponding technical effects under three state of the slave control server, i.e., a state where the slave control server transmits a first request to a storage server actively; a state where the slave control server transmits a first request to a storage server when the master control server is in an unavailable state; and a state where the slave control server transmits a first request to a storage server in an initial startup stage (that is, when an operation is started). In a practical operation of the distributed storage system, an entire period may include an initial startup stage of the slave control server, a normal working stage of the slave control server, and a stage where the master control server is detected in an unavailable state. The slave control server has different functions for data processing in the entire period.

Another embodiment of the present disclosure will be described as follows based on the system states that may occur during a practical operation of the distributed storage system.

In stage (1), in the initial startup stage of the slave control server, a third request is transmitted to each storage server to acquire data copy information, and initial mapping data is created based on the data copy information acquired at this stage.

In stage (2), in the normal working stage of the slave control server, a fourth request may be transmitted periodically to acquire data copy information, and the acquired data copy information is used to periodically update the mapping data.

In stage (3), when the master control server is in an unavailable state, the slave control server transmits a fourth request to obtain current data copy information and update the mapping data, and then the slave control server may replace the master control server to provide a service based on the latest mapping data.

The first request, the second request, the third request, and the fourth request mentioned in the embodiments of the present disclosure are intended to distinguish read requests issued by the slave control server in different stages (or under different states), and operation methods and implementation principles thereof are all consistent.

In general, since a time instant of startup, the slave control server may continuously update the mapping data stored therein through interaction with a storage server during an entire life period. Moreover, compared with an embodiment in which the mapping data is updated when the master control server is in an unavailable state, the updating data in different stages as described in the foregoing embodiment is relatively less, and therefore the data can be updated in a faster speed.

Figure 4:
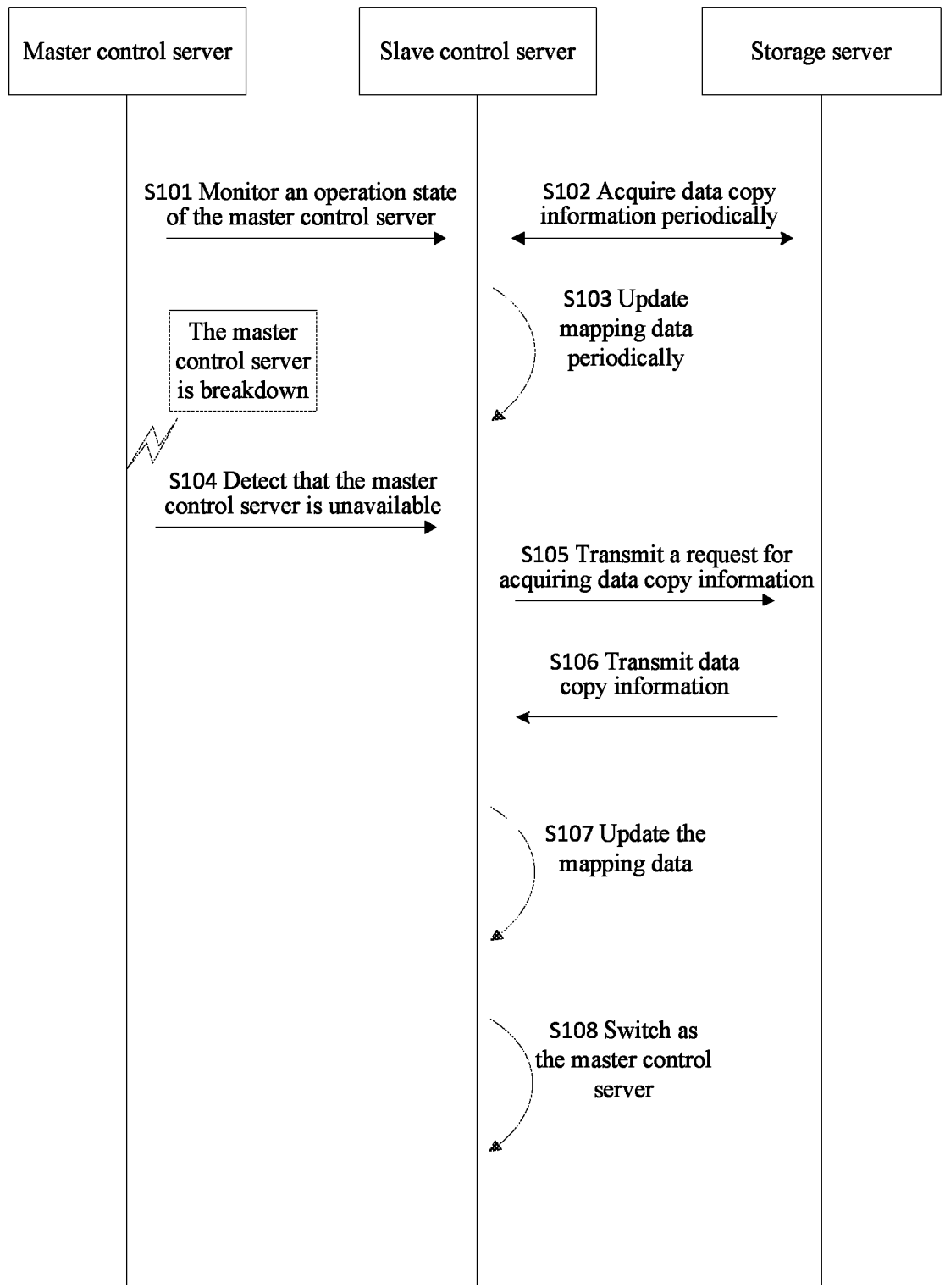
FIG. 4 shows a flowchart of a specific example for implementing a data processing method for a distributed storage system according to an embodiment of the present disclosure.

FIG. 4 shows a specific example of an implementation of a data processing method for a distributed storage system according to an embodiment of the present disclosure. As shown in FIG. 4, in step S101, the slave control server monitors a heartbeat of the master control server through a monitoring procedure of the slave control server, to detect an operation state of the master control server. In step S102, the slave control server periodically transmits a second request for acquiring data copy information to a storage server, and the storage server transmits the data copy information stored therein to the slave control server in response to the second request. In step S103, the slave control server periodically updates, based on the data copy information transmitted from the storage server, mapping data stored therein that indicates a correspondence relationship between the data copy and the storage server. Assuming that the master control server crashes in an operation process, then in step S104, the slave control server may be not able to monitor the master control server within a preset time, and may determine that the master control server is in an unavailable state. Then in step S105, the slave control server transmits a first request for acquiring copy information to each storage server. In step S106, each storage server transmits, in response to the first request, the data copy information stored therein to the slave control server. In step S107, the slave control server revises, based on the data copy information transmitted by the storage server, the data obtained in the last periodical update to obtain updated mapping data. Finally, in step S108, the slave control server automatically replaces the master control server to provide a control service for the distributed storage system.

A data processing method for a distributed storage system is provided according to another embodiment of the present disclosure. The method is implemented by, for example, any storage server shown in FIG. 1. The method includes: receiving a request for acquiring data copy information from a slave control server; and transmitting to the slave control server data copy information corresponding to the storage server, in response to the request for acquiring the data copy information.

A specific implementation of the method may be referred to the above description of the data processing method for the distributed storage system, which will not be repeated herein.

Device Embodiment

A data processing device for a distributed storage system is provided according to an embodiment of the present disclosure. The data processing device is applied to a slave control server of the distributed storage system, and includes a request transmitting module and a data updating module.

The request transmitting module is configured to transmit a first request for acquiring data copy information to each storage server.

The data updating module is configured to update mapping data based on the data copy information returned by each storage server in response to the first request, where the mapping data indicates a correspondence relationship between the data copy information and the storage server.

In an embodiment, the data processing device for the distributed storage system may further include: a detecting module configured to detect whether the master control server is in an unavailable state. In an embodiment, the request transmitting module is configured to transmit the first request for acquiring the data copy information to each storage server in a case where the master control server is in the unavailable state.

In an embodiment, the device further includes a service providing module. The service providing module is configured to replace the master control server to provide a control service for the distributed storage system based on the updated mapping data.

In an embodiment, the request transmitting module may be further configured to periodically transmit the first request for acquiring the data copy information to each storage server according to a set time.

In an embodiment, the data updating module may be configured to modify current mapping data based on the data copy information returned by each storage server in response to the first request, to obtain updated mapping data.

A data processing device for a distributed storage system is provided in another embodiment of the present disclosure. The data processing device is applied to a storage server in a distributed storage system, and includes a request receiving module and a data transmitting module.

The request receiving module is configured to receive a first request for acquiring data copy information from a slave control server.

The data transmitting module is configured to transmit to the slave control server the data copy information stored in the storage server, in response to the first request.

Electronic Equipment Embodiment

An electronic equipment is provided according to an embodiment of the present disclosure. The electronic equipment includes a processor and a memory. The memory stores machine executable instructions that can be executed by the processor, and the processor is configured to execute the machine executable instructions to perform the data processing method for the distributed storage system described in the method embodiments of the present disclosure.

System Embodiment

A distributed storage system is provided according to an embodiment of the present disclosure. The distributed storage system includes a master control server, a slave control server that performs the first method described in the method embodiments of the present disclosure, and a storage server that performs the second method described in the method embodiments of the present disclosure. The storage server is communicatively connected with the master control server and the slave control server, respectively.

Computer-Readable Storage Medium Embodiment

A machine-readable storage medium is provided according to an embodiment of the present disclosure. The machine-readable storage medium stores machine-executable instructions, which, when invoked and executed by a processor, causes the processor to perform a service coordination method for a distributed storage system as described in the method embodiments of the present disclosure.

The embodiments of the present disclosure may be a system, a method, and/or a computer program product. The computer program product may include a computer-readable storage medium loaded with computer-readable program instructions for enabling a processor to implement various aspects of the embodiments of the present disclosure.

The computer-readable storage medium may be a tangible device that may hold and store instructions to be used by an instruction execution device. The computer-readable storage medium may be, for example, but not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM Or flash memory), a static random access memory (SRAM), a portable compact disk read-only memory (CD-ROM), a digital versatile disk (DVD), a memory stick, a floppy disk, a mechanical encoding device such as a punched card or a protruding structure in a groove with instructions stored thereon, and any suitable combination of the above. The computer-readable storage medium used herein is not interpreted as an instantaneous signal itself such as a radio wave or other freely propagating electromagnetic wave, an electromagnetic wave propagating through a waveguide or other transmission medium (for example, an optical pulse through a fiber optic cable), or an electrical signal transferred through a wire.

The computer-readable program instructions described herein may be downloaded from a computer-readable storage medium to various computing/processing devices, or may be downloaded to an external computer or external storage device via a network, such as the Internet, a local area network, a wide area network, and/or a wireless network. The network may include a copper transmission cable, an optical fiber transmission, a wireless transmission, a router, a firewall, a switch, a gateway computer, and/or an edge server. The computer-readable program instructions are received from the network by a network adapter card or network interface in each of the computing/processing devices, and forwarded for storage in the computer-readable storage medium in the computing/processing device.

The computer program instructions for performing operations in the embodiments of the present disclosure may be assembly instructions, instruction set architecture (ISA) instructions, machine instructions, machine-related instructions, microcode, firmware instructions, state setting data, or source code or object code written in any combination of one or more programming languages. The programming languages include an object-oriented programming language such as Smalltalk, C++, and the like, and a conventional procedural programming language such as C language or the like. The computer-readable program instructions may be executed entirely on a user computer, executed partly on the user computer, executed as a stand-alone software package, executed partly on the user computer and partly on a remote computer, or executed entirely on the remote computer or a server. In a case involving a remote computer, the remote computer may be connected to the user computer through any network, such as a local area network (LAN) or wide area network (WAN), or may be connected to an external computer (for example, through the Internet provided by an Internet service provider. In some embodiments, an electronic circuit, such as a programmable logic circuit, a field programmable gate array (FPGA), or a programmable logic array (PLA), may be customized by using status information of the computer-readable program instructions. The electronic circuit may execute the computer-readable program instructions to implement various aspects of the embodiments of the present disclosure.

Here, various aspects of the embodiments of the present disclosure are described with reference to a flowchart and/or block diagram of the method, device (system) and computer program product according to the embodiment of the present disclosure. It should be understood that each of the blocks in the flowchart and/or block diagram and a combination of the blocks in the flowchart and/or block diagram may be implemented by the computer-readable program instructions.

The computer-readable program instructions may be provided to a processor of a general-purpose computer, a special-purpose computer, or any other programmable data processing devices, thereby producing a machine that generates a device for realizing the functions/actions specified in one or more blocks in the flowchart and/or block diagram when the instructions is executed by the processor of the computer or other programmable data processing devices. It is also possible to store the computer-readable program instructions in a computer-readable storage medium. The instructions cause a computer, a programmable data processing device, and/or other devices to work in a specific manner. Therefore, the computer-readable medium storing the instructions includes an article of manufacture, which includes instructions for implementing various aspects of the functions/actions specified in one or more blocks in the flowchart and/or block diagram.

It is also possible to load the computer-readable program instructions on a computer, another programmable data processing devices, or other equipment, so that a series of operation steps are executed on the computer, the programmable data processing device, or the equipment to produce a computer-implemented process, and thereby the instructions executed on the computer, the programmable data processing device, or the equipment realizes the functions/actions specified in one or more blocks in the flowchart and/or block diagram.

The flowchart and block diagram in the accompanying drawings show possible architecture, functions, and operations implemented by the system, the method, and the computer program product according to multiple embodiments of the present disclosure. In view of this, each block in the flowchart or block diagram may represent a module, a program segment, or a part of instructions, which contains one or more pieces of executable instructions for realizing the specified logic function. In some alternative implementations, the functions marked in the blocks may occur in a different sequence than the sequence shown in the drawings. For example, two consecutive blocks may actually be executed substantially in parallel, or sometimes may be executed in a reverse order, which depends on the functions involved. It should also be noted that each of the block in the block diagram and/or flowchart and a combination of the blocks in the block diagram and/or flowchart may be implemented by a dedicated hardware-based system that performs specified functions or actions, or may be realized by a combination of dedicated hardware and computer instructions. It is well known to those skilled in the art that implementation through hardware, implementation through software, and implementation through a combination of software and hardware are all equivalent.

Described above are embodiments of the present disclosure, which are exemplary rather than exhaustive, and is not limited to what is disclosed in the embodiments. Various modifications and changes are apparent for those of ordinary skill in the art, without departing from the scope and spirit of the described embodiments. The choice of terms used herein is intended to best explain the principles, practical applications, or technical improvements in the market of each embodiment, or to enable other ordinary skilled in the art to understand the embodiments disclosed herein. The scope of the embodiments of the present disclosure is defined by the appended claims.

INDUSTRIAL APPLICABILITY

Based on the data processing method and device for the distributed storage system, and the electronic equipment according to the embodiments of the present disclosure, it is not necessary to perform metadata synchronization between the master control server and the slave control server, thus avoiding failure of the metadata synchronization between the master control server and the slave control server due to loss of metadata caused by failure of the master control server in the synchronization process. In this way, the reliability of the distributed storage system is improved.

The invention claimed is:

1. A data processing method for a distributed storage system, wherein the distributed storage system comprises a master control server, a slave control server and a plurality of storage servers, the method is performed by the slave control server of the distributed storage system and comprises:
transmitting, in an initial startup stage, a first request for acquiring data copy information to each storage server of the plurality of storage servers, to newly create mapping data;
periodically transmitting, to each storage server, the first request for acquiring the data copy information; and
updating the mapping data in the slave control server based on the data copy information returned by each storage server in response to the first request, which the mapping data indicates a correspondence relationship between the data copy information and the storage server.

2. The method according to claim 1, further comprising:
detecting whether a master control server is in an unavailable state; and wherein
the transmitting, to each storage server, a first request for acquiring data copy information comprises:
transmitting the first request for acquiring the data copy information to each storage server, in a case where the master control server is in the unavailable state.

3. The method according to claim 2, further comprising:
replacing the master control server to provide a control service for the distributed storage system based on the updated mapping data.

4. The method according to claim 1, wherein the updating mapping data based on the data copy information returned by each storage server in response to the first request, where the mapping data indicates a correspondence relationship between the data copy information and the storage server comprises:
modifying current mapping data based on the data copy information returned by each storage server in response to the first request, to obtain updated mapping data.

5. A data processing method for a distributed storage system, performed by a storage server of the distributed storage system, comprising:
receiving, in an initial startup stage, a first request for acquiring data copy information from a slave control server;
transmitting the data copy information to the slave control server in response to the first request, to newly create mapping data;
periodically receiving the first request for acquiring the data copy information from the slave control server; and
transmitting, to the slave control server, the data copy information stored in the storage server, in response to the first request, wherein the data copy information is used to update the mapping data for indicating a correspondence relationship between the data copy information and the storage server.

6. A data processing device for a distributed storage system, wherein the distributed storage system comprises a master control server, a slave control server and a plurality of storage servers, and the data processing device is provided in the slave control server of the distributed storage system, wherein the data processing device comprises a processor and a memory, wherein
the memory stores machine executable instructions that be executable by the processor, and
the processor is configured to execute the machine executable instructions to:
transmit, in an initial startup stage, a first request for acquiring data copy information to each storage server, to newly create mapping data;
periodically transmit the first request for acquiring the data copy information to each storage server; and
update the mapping data in the slave control server based on the data copy information returned by each storage server in response to the first request, wherein the mapping data indicates a correspondence relationship between the data copy information and the storage server.

7. The data processing device for the distributed storage system according to claim 6, wherein the processor is configured to execute the machine executable instructions to:
  detect whether a master control server is in an unavailable state; and
  transmit the first request for acquiring the data copy information to each storage server, in a case where the master control server is in the unavailable state.

8. The data processing device for the distributed storage system according to claim 7, wherein the processor is configured to execute the machine executable instructions to:
  replace the master control server to provide a control service for the distributed storage system based on the updated mapping data.

9. The data processing device for the distributed storage system according to claim 6, wherein the processor is configured to execute the machine executable instructions to:
  modify current mapping data based on the data copy information returned by each storage server in response to the first request, to obtain updated mapping data.

* * * * *